(12) United States Patent
Chen et al.

(10) Patent No.: US 7,391,606 B2
(45) Date of Patent: Jun. 24, 2008

(54) ELECTRONIC DEVICE

(75) Inventors: Liang-Yi Chen, Tainan County (TW); Chung Hsien Chin, Taipei (TW)

(73) Assignees: QISDA Corporation, Taoyuan (TW); BENQ Corporation, Taipei (TW)

(*) Notice: Subject to any disclaimer, the term of this patent is extended or adjusted under 35 U.S.C. 154(b) by 0 days.

(21) Appl. No.: 11/743,618

(22) Filed: May 2, 2007

(65) Prior Publication Data
US 2007/0291445 A1    Dec. 20, 2007

(30) Foreign Application Priority Data
Jun. 14, 2006  (TW) .............................. 95121168 A

(51) Int. Cl.
*G06F 1/16* (2006.01)
(52) U.S. Cl. ................ 361/681; 312/223.1; 248/917; 248/918
(58) Field of Classification Search ......... 361/679–683; 312/223.1, 223.2; 248/917–923
See application file for complete search history.

(56) References Cited

U.S. PATENT DOCUMENTS

| 5,768,096 | A  | * | 6/1998  | Williams et al. ............ 361/681 |
|-----------|----|---|---------|-------------------------------------|
| 6,651,943 | B2 | * | 11/2003 | Cho et al. ................. 248/122.1 |
| 6,678,153 | B2 | * | 1/2004  | Chen et al. .................. 361/681 |
| 6,807,050 | B1 | * | 10/2004 | Whitehorn et al. .......... 361/681 |
| 7,320,451 | B2 | * | 1/2008  | Ogawa ........................ 248/161 |
| 2005/0127253 | A1 | * | 6/2005  | Kim ......................... 248/176.1 |
| 2005/0248498 | A1 | * | 11/2005 | Webb et al. ................. 343/880 |
| 2006/0050471 | A1 | * | 3/2006  | Chen .......................... 361/681 |
| 2007/0159784 | A1 | * | 7/2007  | Chen et al. .................. 361/683 |

* cited by examiner

*Primary Examiner*—Jayprakash N Gandhi
*Assistant Examiner*—Anthony Q Edwards
(74) *Attorney, Agent, or Firm*—Quintero Law Office

(57) ABSTRACT

An electronic device comprises a body and an arm member disposed on the body. The body has a reference point. The arm member is moved between a first status, a second status and a third status. When the arm member is situated at the first status, the arm member relatively supports the body with respect to the reference point of the body. When the arm member is situated at the second status, the arm member relatively carries or suspends the body with respect to the reference point of the body.

9 Claims, 5 Drawing Sheets

ELECTRONIC DEVICE

BACKGROUND OF THE INVENTION

1. Field of the Invention

The invention relates to an electronic device, and in particular to an electronic device capable of being height-adjusted, carried or hung on a wall.

2. Description of the Related Art

In general, the height and rotation of an LCD panel can be adjusted with respect to a seat thereof. To conveniently move the LCD, particularly a large-size LCD, the panel and the seat must be held simultaneously.

BRIEF SUMMARY OF THE INVENTION

The invention provides an electronic device capable of being height-adjusted and moved. The electronic device, detachably disposed on a base surface, comprises a body and an arm member. The body comprises a reference point. The arm member pivoted to the body comprises a first portion, a second portion and a first status. When the arm member is situated in the first status, the first portion and the second portion of the arm member form a first predetermined angle therebetween and the arm member contacting the base surface supports the body, wherein the first predetermined angle is varied with respect to a distance between the reference point of the body and the base surface.

The arm member further comprises a second status, and the first portion and the second portion of the arm member form a second predetermined angle therebetween and the arm member separated from the base surface carries the body when the arm member is situated in the second status.

The arm member further comprises a third status, and the first portion and the second portion of the arm member are substantially parallel and the arm member separates from the base surface carries the body when the arm member is situated in the third status. The first portion comprises a first connecting end pivoted to the body and the second portion comprises a second connecting end pivoted to the body. The first portion comprises a first L-shaped end and the second portion comprises a second L-shaped end, and the body is supported by the first L-shaped end of the first portion and the second L-shaped end of the second portion.

The electronic device further comprises a coupler disposed between the body and the arm member to allow the arm member to move relatively with respect to the body with at least one degree of freedom. The distance decreases with respect to the increasing first predetermined angle. The body can be a panel, and the electronic device can be a display.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
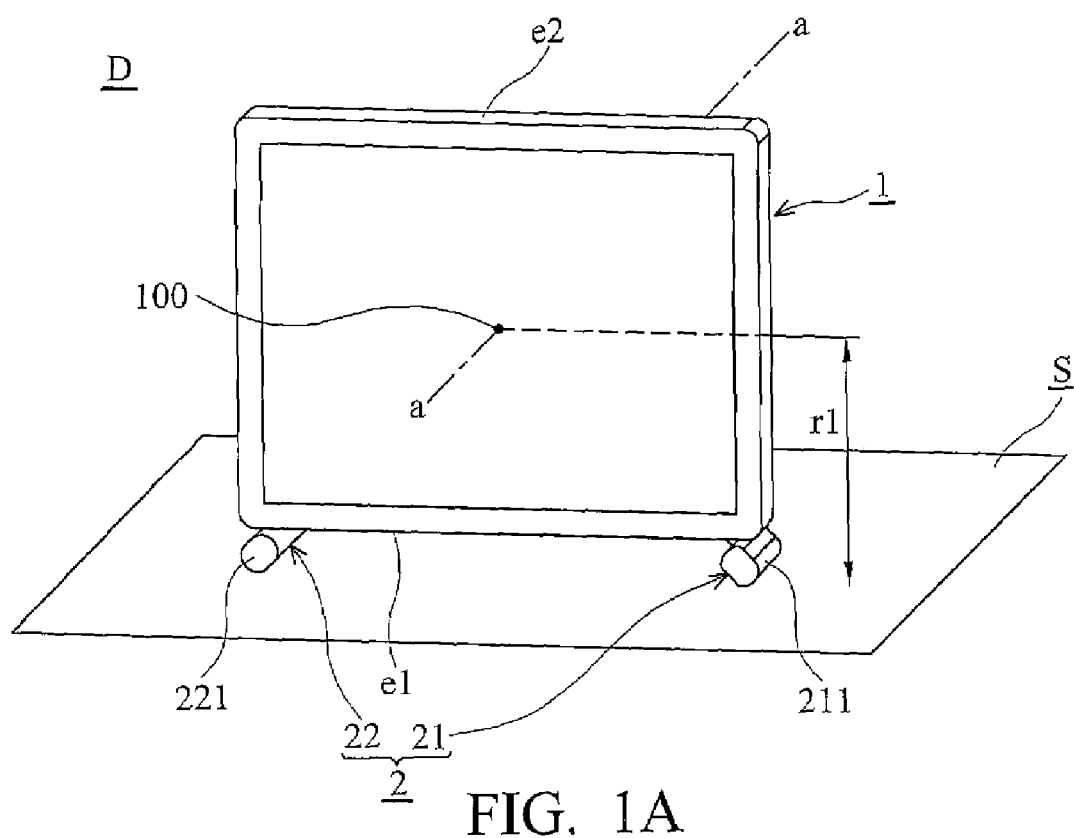
FIG. 1A is a perspective view of an electronic device of the invention.
Figure 1B:
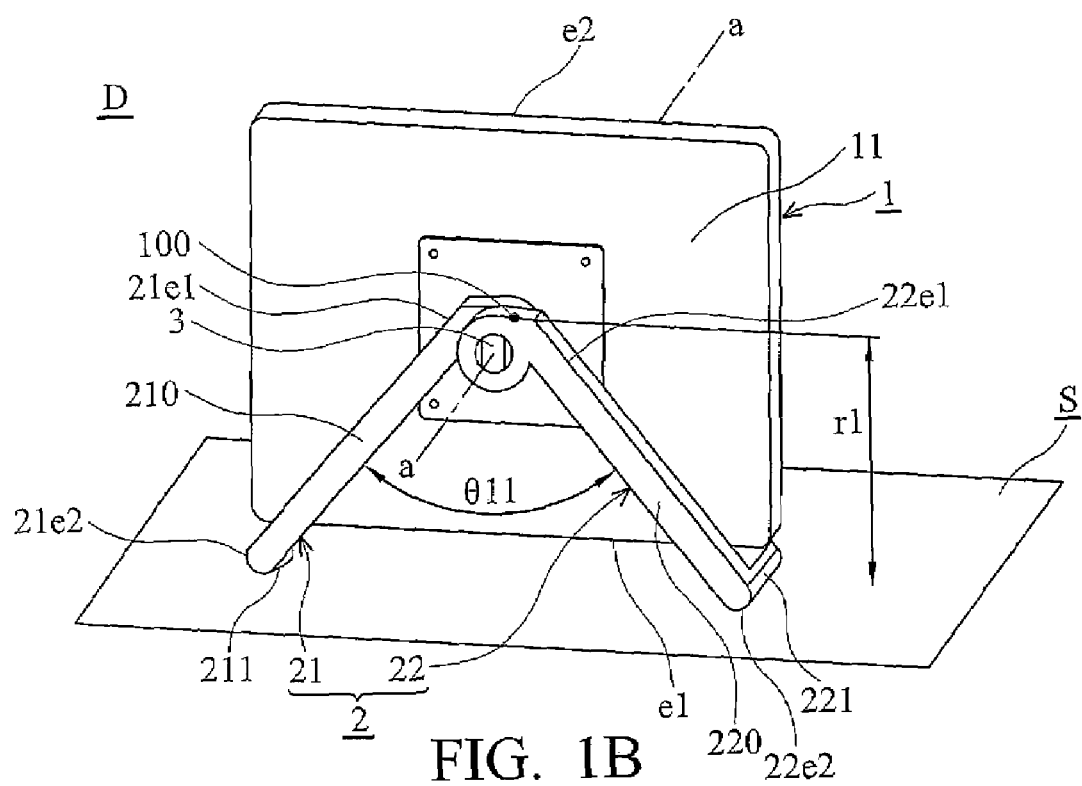
FIG. 1B is a perspective view of the electronic device of FIG. 1A.

In FIGS. 1A and 1B, an electronic device D is detachably disposed on a base surface S. In this embodiment, the electronic device D is a display.

The electronic device D comprises a body 1 such as an LCD panel, an arm member 2 and a coupler 3 disposed between the body 1 and the arm member 2. The body 1 is rotated along an axis a-a with respect to the arm member 2 via the coupler 3.

The body 1 comprises a first end e1, a second end e2, a reference point 100 and a back side 11. The first and second ends e1 and e2 are respectively a bottom end and a top end thereof, and the reference point 100 located between the first and second ends e1 and e2 has a reference distance r1 with respect to the base surface S. In this embodiment, the reference point 100 is a geometrical center of the body 1, and the reference distance r1 represents a first height of the body 1.

The arm member 2 comprises a first portion 21 and a second portion 22, synchronically pivoted to the body 1. The first portion 21 comprises a first body 210, a first extending portion 211, a first connecting end 21e1 and a first L-shaped end 21e2 formed by the first body 210 and the first extending portion 211. The second portion 22 comprises a second body 220, a second extending portion 221, a second connecting end 22e1, and a second L-shaped end 22e2 formed by the second body 220 and the second extending portion 221. The first connecting end 21e1 of the first portion 21 and the second connecting end 22e1 of the second portion 22 are pivoted to the body 1, so that the body 1 is supported by the first L-shaped end 21e2 of the first portion 21 and the second L-shaped end 22e2 of the second portion 22. The arm member 2 is switched between a first status (shown in FIGS. 1A, 1B, 2A and 2B) and a second status (shown in FIG. 3B). The coupler 3 disposed between the body 1 and the arm member 2 is connected to the back side 11 of the body 1.

The first and second portions 21 and 22 of the arm member 2 having a first predetermined angle θ11 therebetween contact the first end e1 of the body 1 and the base surface S simultaneously, for supporting the body 1 thereon. The first predetermined angle θ11 is varied according to the distance between the reference point 100 of the body 1 and the base surface S. A first distance r1 is formed between the reference point 100 of the body 1 and the base surface S.

Figure 2A:
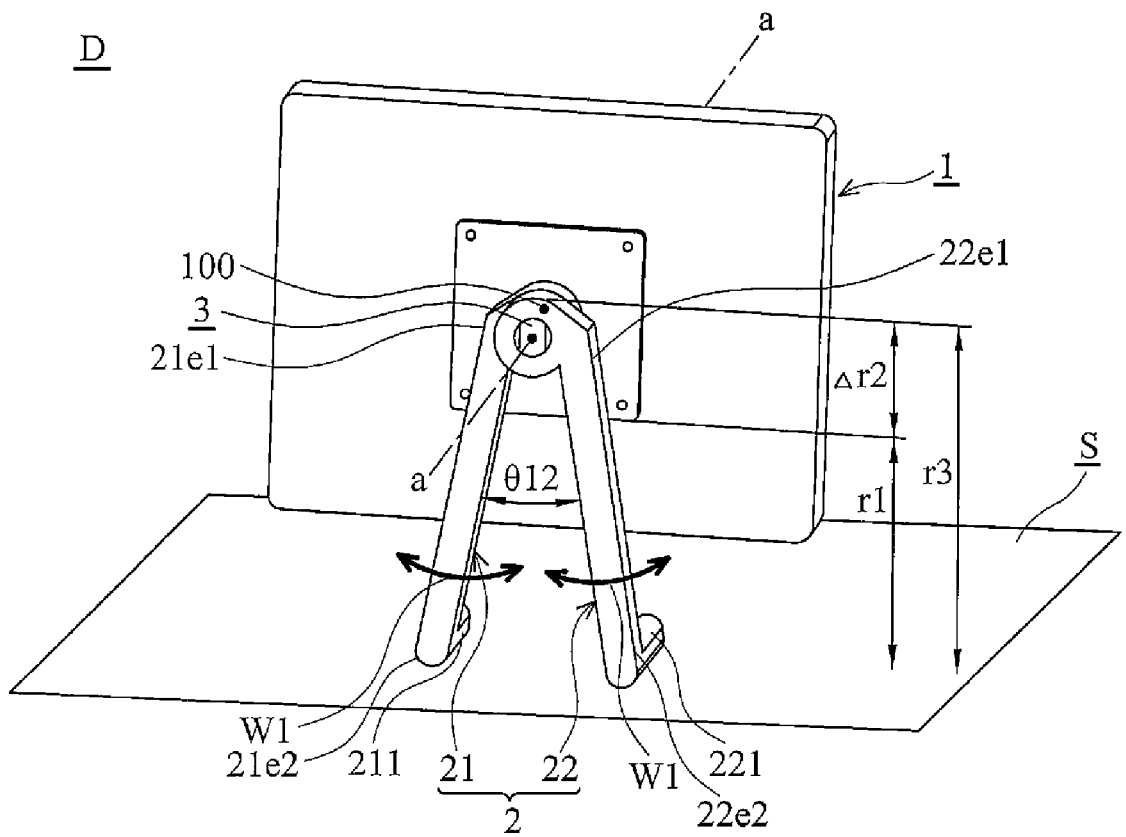
FIG. 2A is a perspective view of the electronic device situated in another status.
Figure 2B:
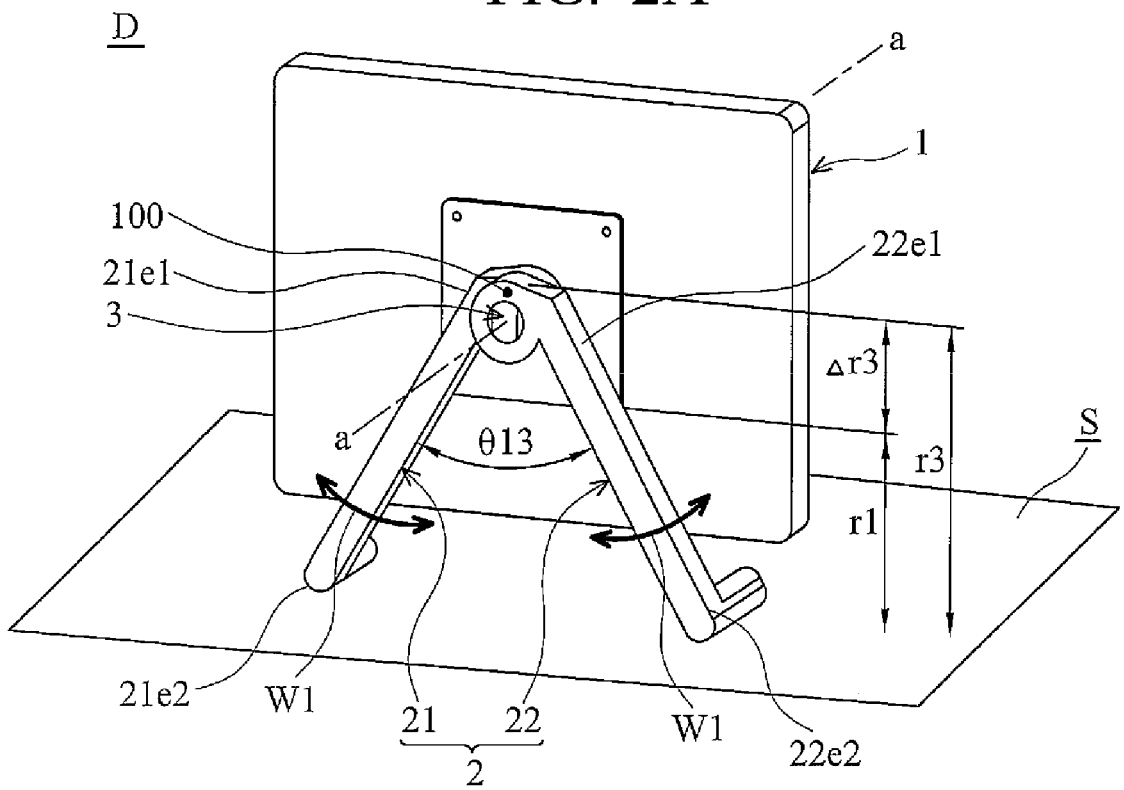
FIG. 2B is a perspective view of the electronic device situated in another status.

In FIGS. 2A and 2B, two different angles θ12 and θ13 formed between the first and second portions 21 and 22 of the arm member 2 are presented. The first and second portions 21 and 22 of the arm member 2 having angles θ12 and θ13 therebetween contact the base surface S, but do not contact the first end e1 of the body 1, thus the body 1 is supported on the base surface S. The angles θ12 and θ13 are varied according to the distance between the reference point 100 of the body 1 and the base surface S. Two different distances r2 and r3, formed between the reference point 100 of the body 1 and the base surface S in FIGS. 2A and 2B, represent a second height and a third height of the body 1, respectively. A height difference Δr2 is formed between the second height r2 and the first height r1 and a height difference Δr3 is formed between the third height r3 and the first height r1. The height difference Δr2 is unequal to the height difference Δr3.

Figure 3A:
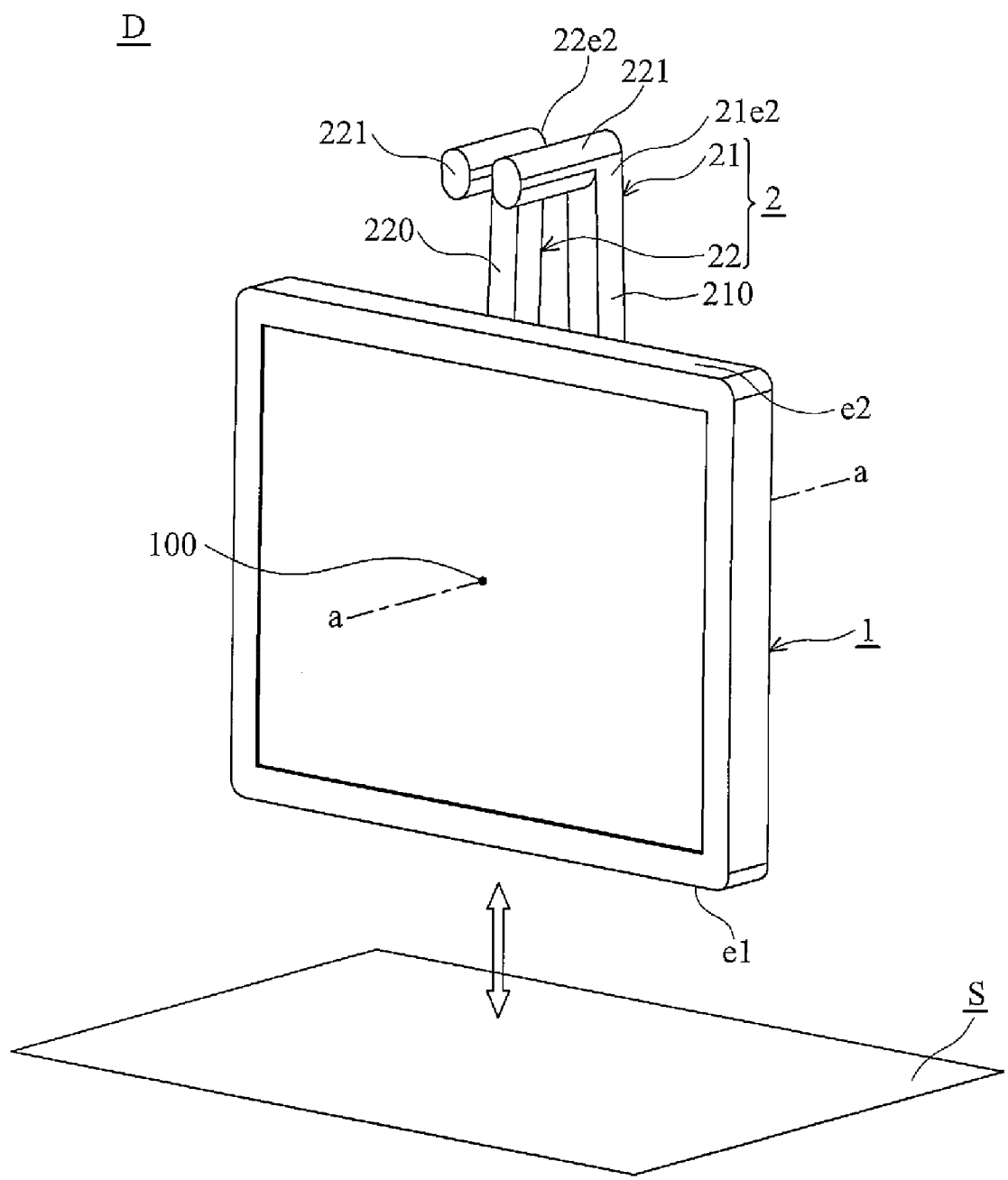
FIG. 3A is a perspective view of the electronic device situated in another status.
Figure 3B:
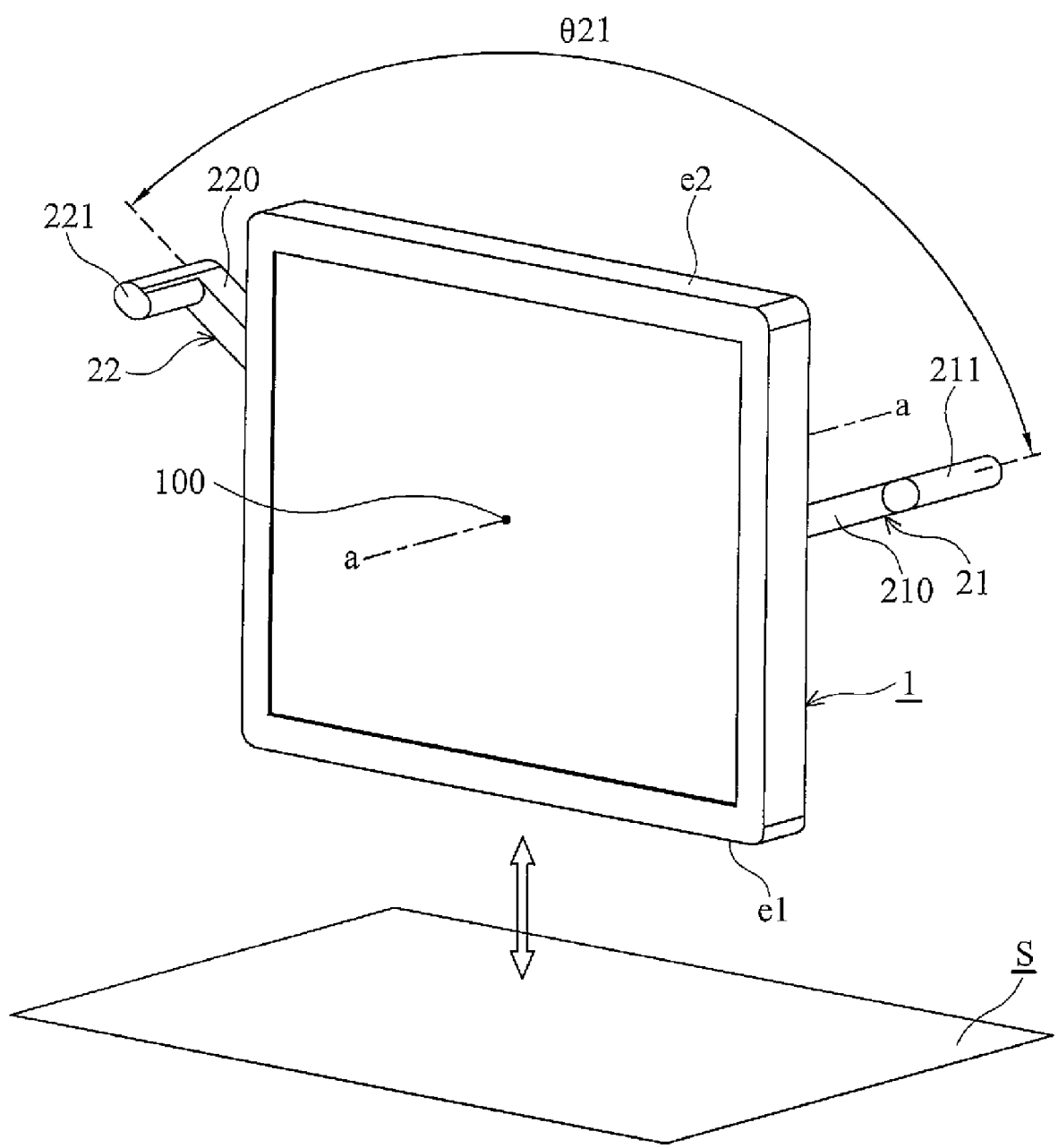
FIG. 3B is a perspective view of the electronic device situated in another status.

In FIG. 3A, the arm member 2 situated in the second status carries the body 1 above the base surface S without contacting the base surface S with respect to the reference point 100. In FIG. 3B, the arm member 2 situated in a third status carries the body 1 above the base surface S without contact the base surface S. The first and second portions 21 and 22 of the arm member 2 are substantially parallel.

Figure 4:
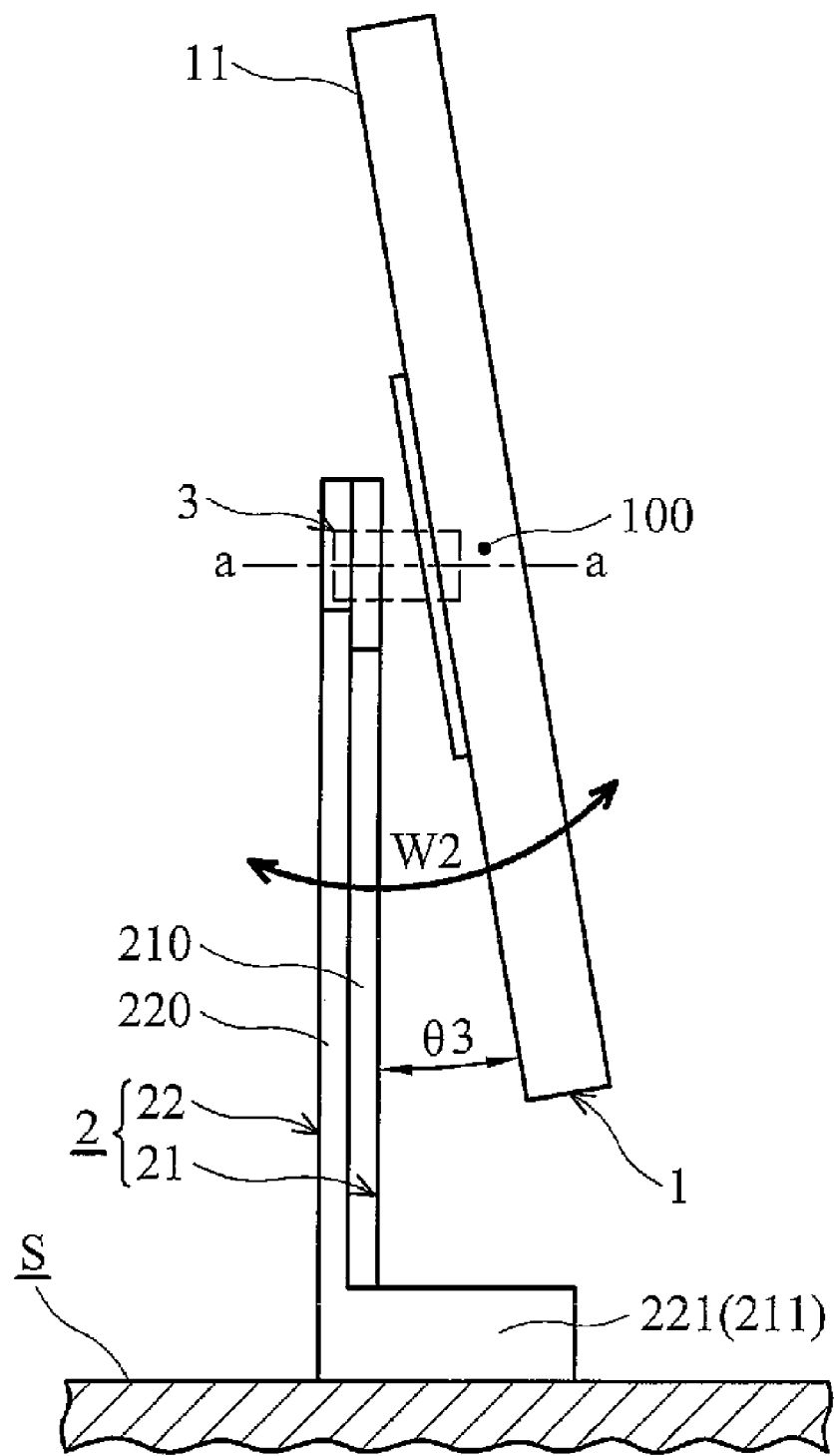
FIG. 4 is a side view of the electronic device.

In FIG. 4, the body 1 tilted along a direction W2 has an angle θ3 with respect to the arm member 2 disposed on the base surface S. With the arm member 2 disposed on the base surface S, the tilted body 1 still can be stably supported. Note that the coupler 3 disposed between the body 1 and the arm member 2 allows the arm member 2 to relatively move with respect to the body 1 with degree of freedom W1 and/or W2.

Thus, the electronic device of the embodiment provides an arm member capable of carrying the body 1, for supporting and adjusting height of the body 1 on the base surface S, or hanging the body 1 on a wall (not shown in the Figures).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, detachably disposed on a base surface, the electronic device comprising:
    a body comprising a reference point; and
    an arm member pivoted to the body, comprising a first portion, a second portion and a first status, when the arm member is situated in the first status, the first portion and the second portion of the arm member form a first predetermined angle therebetween and the arm member contacting the base surface supports the body, wherein the first predetermined angle is varied with respect to a distance between the reference point of the body and the base surface.

2. The electronic device as claimed in claim 1, wherein the arm member further comprises a second status, and the first portion and the second portion of the arm member form a second predetermined angle therebetween and the arm member separated from the base surface carries the body when the arm member is situated in the second status.

3. The electronic device as claimed in claim 2, wherein the arm member further comprises a third status, and the first portion and the second portion of the arm member are substantially parallel and the arm member separated from the base surface carries the body when the arm member is situated in the third status.

4. The electronic device as claimed in claim 1, wherein the first portion comprises a first connecting end pivoted to the body and the second portion comprises a second connecting end pivoted to the body.

5. The electronic device as claimed in claim 1, wherein the first portion comprises a first L-shaped end and the second portion comprises a second L-shaped end, and the body is supported by the first L-shaped end of the first portion and the second L-shaped end of the second portion.

6. The electronic device as claimed in claim 1 further comprising a coupler disposed between the body and the arm member to allow the arm member relatively moving with respect to the body with at least one degree of freedom.

7. The electronic device as claimed in claim 1, wherein the body comprises a panel.

8. The electronic device as claimed in claim 1, wherein the distance decreases with respect to the increasing first predetermined angle.

9. The electronic device as claimed in claim 1, wherein the electronic device comprises a display.

* * * * *